United States Patent [19]

Rossi

[11] Patent Number: 4,934,620
[45] Date of Patent: Jun. 19, 1990

[54] APPARATUS FOR WINDING COAXIAL INSULATION ONTO A WINDING CORE

[76] Inventor: Guido Rossi, Wickenweg 19, CH-8048 Zurich, Switzerland

[21] Appl. No.: 297,432

[22] Filed: Jan. 17, 1989

[30] Foreign Application Priority Data

Jan. 18, 1988 [CH] Switzerland ............ 164/88

[51] Int. Cl.$^5$ .......................................... B65H 35/02
[52] U.S. Cl. ................................ 242/56 R; 242/56.1
[58] Field of Search ................. 242/56 R, 56.1, 56.2, 242/56.3, 56.4, 56.5, 56.6, 56.7, 56.8, 56.9, 66, 75.1

[56] References Cited

U.S. PATENT DOCUMENTS

| 1,959,418 | 5/1934 | Fourness ................. 242/75.1 X |
| 2,058,243 | 10/1936 | Lippincott et al. ............. 242/66 |
| 3,416,287 | 12/1968 | Hawkins et al. ............ 242/56 R X |
| 3,640,480 | 2/1972 | Schleich .................. 242/56 R |
| 3,782,664 | 1/1974 | Alberto ................... 242/56 R |
| 4,143,828 | 3/1979 | Braun et al. .............. 242/75.1 X |
| 4,146,188 | 3/1979 | Hewinson et al. .......... 242/75.1 X |
| 4,250,604 | 2/1981 | Utner et al. ............. 242/56.1 X |
| 4,508,279 | 4/1985 | Tokuno et al. ............. 242/56 R |
| 4,630,784 | 12/1986 | Roy .................... 242/56.1 |
| 4,648,927 | 3/1987 | Droll et al. ............. 242/56 R X |

FOREIGN PATENT DOCUMENTS

| 101366 | 8/1983 | European Pat. Off. ......... 242/56 R |
| 514311 | 12/1930 | Fed. Rep. of Germany ....... 242/66 |
| 118641 | 7/1984 | Japan .................. 242/56 R |

Primary Examiner—Donald Watkins
Attorney, Agent, or Firm—Burns, Doane, Swecker & Mathis

[57] ABSTRACT

For the construction of an insulating wound body 8 for electrical insulation purposes, in an installation 50 for the formation of a stack 24, sheets 21 and/or precut sheets blanks 21' are prepared from a web of material. The sheet stack 24 precedes the winding apparatus 10 and the winding material is supplied in a manner such that the width of the sheets corresponding to the winding width coincides with the length of the sheet segment, and the length of the sheets corresponds to the width of the web. The winding material is taken by a perforated conveyor 9 revolving around rolls (in the running direction of the winding apparatus 10), and the insulating sheets 21 and/or sheet blanks 21' are entrained by the segment of the conveyor belt between a lower roll 1 and the preceding reversing roll 3 and wound with edge to edge contact, without gaps, onto a conductor or inner tube 5 freely supported between the stationary lower roll 1 and upwardly mobile upper roll 2, without tensile stresses.

20 Claims, 7 Drawing Sheets

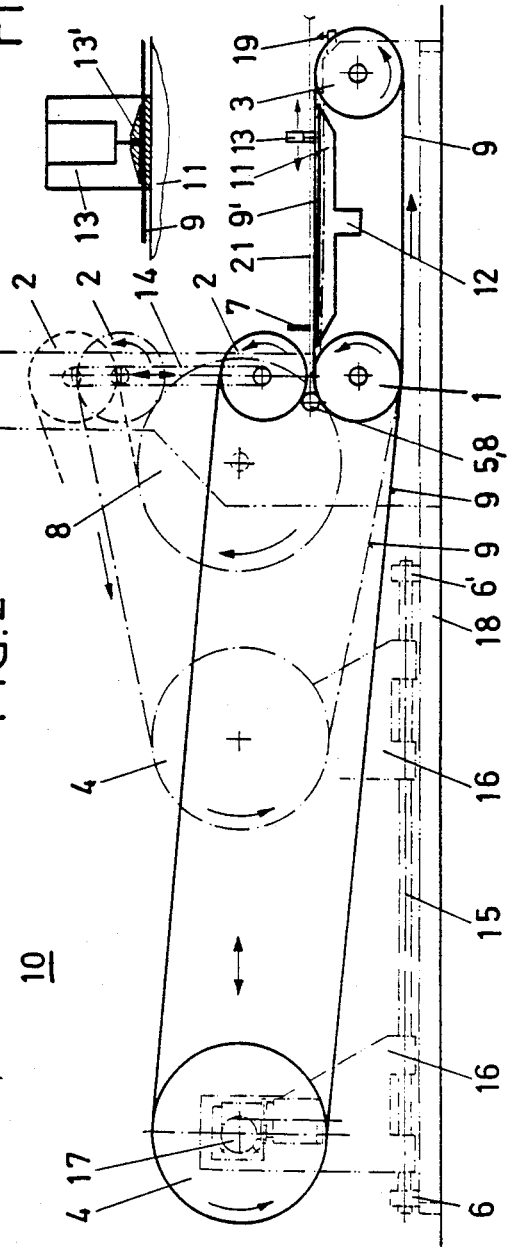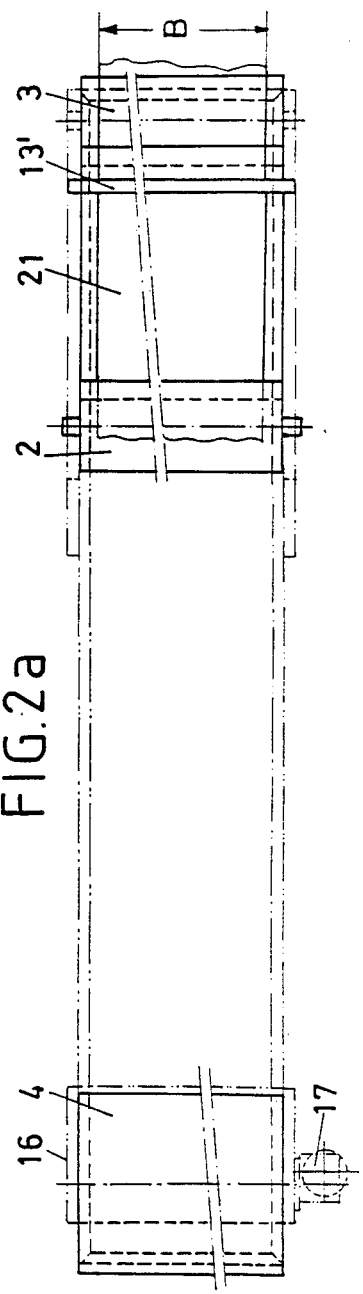

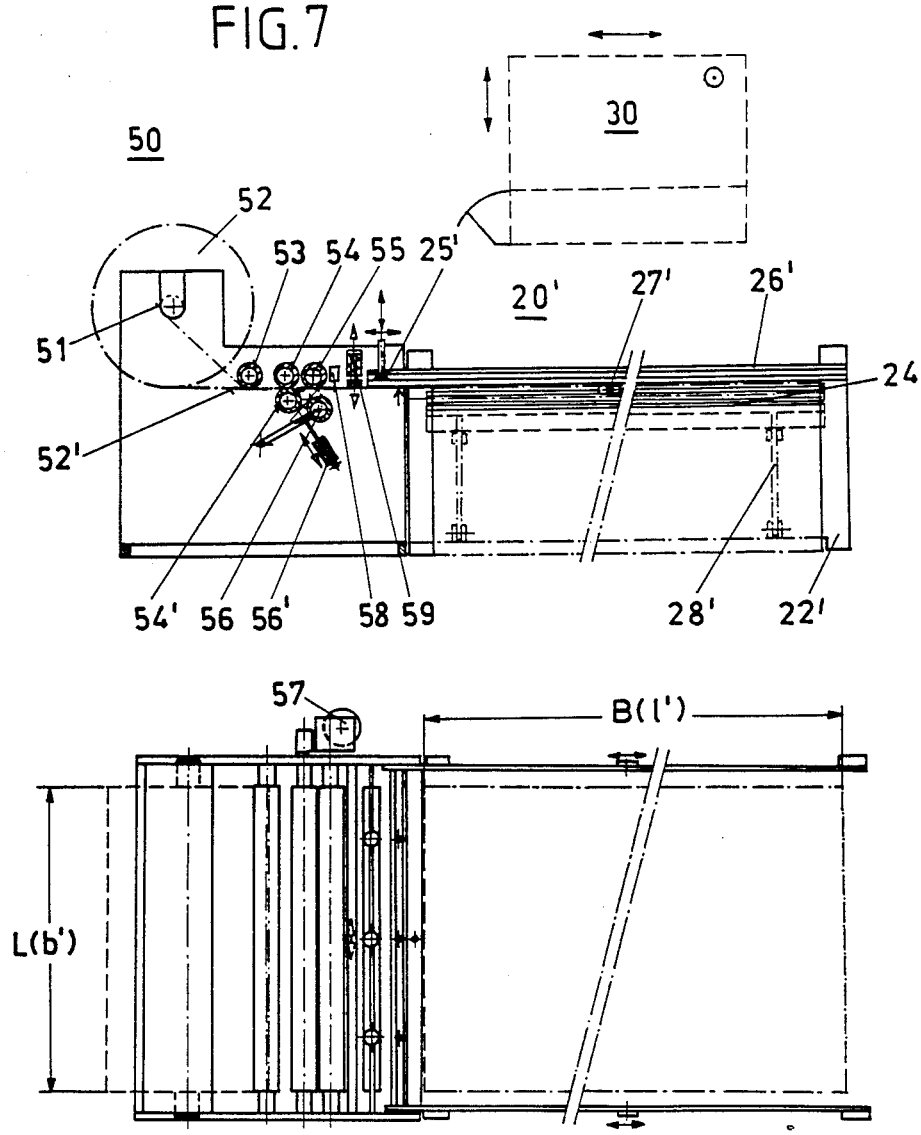

ized the height of the body, e.g., the bushing insulation the webs of the material are wound under a relatively high tensile stress, whereby undesirable tensile forces are applied to the webs of the insulating material and the risk of microcracking is increased. If crepe paper is used, most of the

APPARATUS FOR WINDING COAXIAL INSULATION ONTO A WINDING CORE

BACKGROUND OF THE INVENTION

1. Field of the Invention

The present invention concerns an apparatus for the application of a coaxial insulation to a conductor or an inner tube for the purpose of electrical insulation.

2. Description of Related Art

U.S. Pat. No. 3,737,116 discloses a winding machine for high voltage capacitor bushings which makes it possible to produce wound bodies up to a height of about 10.0 m., which is the maximum working width of the winding machine. An optimal feeding occurs when the width of the web of insulation material corresponds to the height of the body, e.g., the bushing insulation wound with the insulating material. However, such situations are limited because the maximum widths of the insulating material is limited to about 5.0 m. Webs of the insulating material must therefore be wound, for example, by overlapping the web, which, however, makes it difficult, even in the case of relatively small layer thicknesses, to produce such bodies without gaps. Gaps are formed by the partial separation of successive layers of the web, particularly due to the three-dimensional shrinkage reaction during the hardening of finished bushings impregnated with a plastic. The width of the gap may amount to several millimeters, but it may be as small as a microcrack. Gaps in high voltage insulation, for example, in high voltage bushings, are undesirable, as the air included in the gaps may be ionized, which may easily lead to punctures. Such insulation is not resistant to voltage surges.

It is possible to cut the incoming paper web during the winding, so that the wound body will assume a predetermined shape, for example, a conical form at both ends. The cuts parts are removed as waste.

It has therefore been proposed, for example, according to DE-OS No. 27 57 56, to apply two or more overlapping webs of insulating material to the winding body, and to cut, by a cutting device, the overlapping parts of the two adjacent webs of the insulating material prior to their application on the wound body. Between the two adjacent webs the smallest possible partition gap is created following the removal of the overlapping parts, and the winding and cutting devices are shifted axially if the former body is stationary. If, on the other hand, the cutting and winding devices are stationary, the former body is shifted axially so that the parting lines are covered from layer to layer, or after several layers, by the subsequent winding layer.

A disadvantage is the involved mode of operation and the relatively high waste of insulating material.

A further disadvantage is that, in view of the cutting means required between adjacent webs of the insulating material, parting gaps cannot be avoided.

A general disadvantage also consists of the fact that in the form of wound bodies provided with conducting inserts from webs of the insulating material, it is not possible to apply conducting inserts in a coaxially closed manner around a predetermined circumference of the wound body, as each insert is covered on both sides by the insulating material.

In order to produce a wound body free of gaps and microcracks, it has been proposed, according to DE No. 12 37 657, to use crepe paper without pressure in winding the layers. The crepe pattern of the crepe paper is retained, at least in part, during the winding process.

Although this results in improved insulating properties, at least in the direction of winding, i.e., in the diameter of the wound body, the insulating properties are not effected along the height axis, i.e., transverse to the direction of winding, because the elongation of the crepe paper is assured in the winding direction only, while an elongation of the crepe paper is desirable particularly in the height of the wound body, in view of the reaction shrinkage.

In all of the aforementioned processes for the production of wound bodies of an insulating material, the webs of the material are wound under a relatively high tensile stress, whereby undesirable tensile forces are applied to the webs of the insulating material and the risk of microcracking is increased. If crepe paper is used, most of the crepe pattern is lost in the winding process. In addition, the determination of the diameter of the body and thus the positioning of the inserts is rendered difficult.

SUMMARY AND OBJECTS OF THE PRESENT INVENTION

It is an object of the invention to provide an apparatus for the production of wound bodies of an insulating material free of gaps and microcracks, whereby it is possible to apply independently of the height of the wound body a continuous coaxial insulation free of tensile stress to a conductor, without any overlapping of the individual layers.

An advantage of the invention resides, in particular, in that, regardless of the width of the web of the insulating material, the wound bodies may be produced over their entire height with a single layer that extends over the full width of the wound body. In the working step preceding the winding process, webs of the insulating material are drawn from a roll with a maximum width of 5 m., and are cut and stacked as sheets of the insulating material. The cut lengths are supplied to the winding apparatus in a manner such that the length of the material sections correspond to the height required of the insulating material body.

By winding a single layer in this fashion, the otherwise necessary overlapping of the layers, and the gaps created thereby between the individual layers, are eliminated.

A further advantage is the winding free of tensile stress of the individual sheets of the insulating material and/or the cut sheet blanks by means of a revolving belt on the freely supported conductor or inner tube, whereby the successive sheets of the insulating material are abutting edge to edge without gaps. This largely prevents cracking transversely to the wound body.

The winding of sheets and/or cut blanks of insulating material in this manner is especially advantageous if sheets and/or cut blanks of crepe paper are used, the elongation of 15 to 50% of which takes place not transversely to the wound body, but in the axial length of the wound body of the insulating material, so that microcracks, which are formed in particular during the reaction shrinkage in the course of the hardening of finished, plastic impregnated wound bodies and which are largest in the axial length of the insulating material wound, are also largely prevented.

In the production of capacitor bushings, the conducting insert blanks for potential control may be applied during the winding individually to the corresponding sheets of the insulating material, or advantageously during the stacking of the insulating sheets to the sheets to be wound at a predetermined diameter of the wound body and fixed thereon.

It is further possible to precut the sheets of the insulating material to size prior to stacking in accordance with the final configuration of the wound body, so that the usual mechanical cutting, for example by the conical shaping of the two ends of the wound body is eliminated. Significant material savings are achieved when precut sheets of the insulating material are obtained by the computer controlled longitudinal sectioning of the web of the insulating material, without any waste.

In an advantageous manner, the conducting insert blanks may be applied to wound bodies with a small diameter around the appropriate wound body circumference in a coaxially closed manner, by interrupting, phase by phase, the feeding of the insulating material sheet or cut blanks. The layers in mutual contact of the wound insert blanks prevent rupturing of the layers in case of electrical surges and reduce the active wall thickness, for example, of the bushing by 15 to 25%, because some of the sheets of the insulating material are eliminated between the inserts.

The invention will become more apparent from the following description of the preferred embodiments.

BRIEF DESCRIPTION OF THE DRAWINGS

In the drawing:

FIG. 2 is a view of a winding apparatus;

FIG. 2a is a ground plan of the winding apparatus of FIG. 2;

FIG. 2b is a detail view of a cutting device of the winding apparatus of FIG. 2;

FIG. 7 is a lateral elevation of an apparatus for the formation of a stack of sheets combined with the apparatus for the taking of the sheets according to FIGS. 3 and 3a and with the device for the preparation and feeding of conducting insert blanks according to FIGS. 4 and 4a;

FIG. 7a is a ground plan of the apparatus of FIG. 7;

DETAILED DESCRIPTION OF THE PREFERRED EMBODIMENTS

Figure 1:
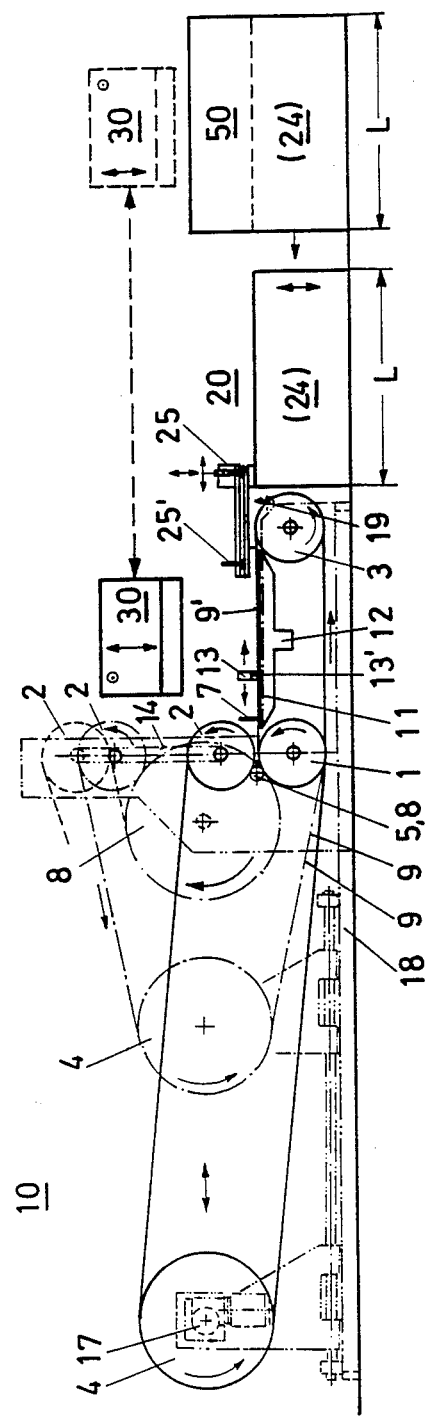
FIG. 1 is a schematic overall view of a layout according to the invention illustrating the feeding of a winding material from a stack of sheets and illustrating an apparatus for the preparation and feeding of conducting insert blanks, together with an apparatus to form the stack of sheets.

In a layout according to the present invention, a winding apparatus 10 is fed with sheets 21 and/or cut blanks 21' of an insulating material placed in a stack 24, instead of a sheet web 52' required heretofore. The sheets 21 or cut blanks 21' are wound onto a rigid conductor or a rigid inner tube 5. The sheets 21 of the insulating material and/or the precut blanks 21' are drawn in a preceding work stage, for example, by an apparatus 50 (See FIG. 7) discontinuously preceding the winding apparatus 10 from a sheet web 52' of the insulating material located at an unwinding device 51 to form a stack of sheets. The insulating material is cut to size and stacked in the form of sheets, as illustrated in FIGS. 7 and 7a. The web 52' of the insulating material has a width (b') of about 2 m. to a maximum of 5 m. The width (b') corresponds to the length (L) of the sheets of the insulating material. The width (B) of the sheets of the insulating material corresponds to the cut length (1') of the web 52' and to the height of the wound body. The width (B) is freely chosen, said sheets being supplied to the winding apparatus 10 with a width (B) of 1.0 m to a maximum of 10.0 m, as a function of the configuration of the winding apparatus 10.

It is possible in this manner to feed to the winding apparatus 10, over the winding width (B), a single layer of the insulating material, which has been cut so as to overcome the limited width (b') of the web of the insulating material. Accordingly, it is no longer necessary to overlap the web to achieve the winding width (B). The sheets 21 of the insulating material may be precut in accordance with the final configuration of the wound body 8 without waste, and then fed in the form of precut sheet blanks 21' to the winding apparatus 10 from the stack, and wound, so that any later mechanical cutting, for example of the conical ends of a bushing, is eliminated.

If, for example in the manufacture of capacitor bushings, conductor sheet blanks 31 are to be wound between predetermined layers of the insulating sheets on the wound body 8, two embodiments of the layout according to the invention may be considered. Firstly, according to FIG. 4, the conducting insert blanks 31 are prepared in an apparatus 30 indicated by solid lines and integrated with the winding apparatus 10 for the preparation and feeding of insert blanks. The conducting insert blanks 31 are transported to the winding apparatus 10 and wound onto the conductor or inner tube 5, together with the appropriate sheets 21 or precut sheet blanks 21' of insulating material. This configuration makes possible the universal application of the winding apparatus 10 and is advantageous particularly for smaller production runs.

In the second embodiment, the insert blanks 31 are placed during the formation of the stack 24 of sheets by the apparatus shown by broken lines in FIG. 1 for the preparation and transportation of insert blanks, onto the appropriate insulating sheets 21 and/or precut insulating blanks 21' and fixed thereon, so that both the insulating sheets 21 and/or insulating blanks 21' and the conducting blanks 31 are introduced together from the stack 24 directly to the winding apparatus 10. The second embodiment is particularly advantageous in the case of larger production runs of capacitor bushings.

Figure 4:
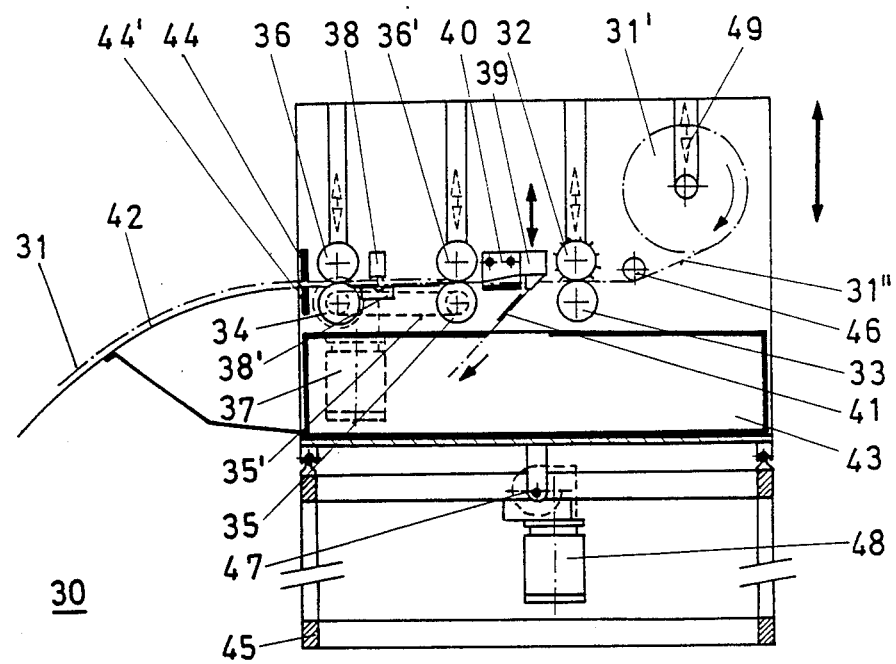
FIG. 4 is a longitudinal section of a device for the preparation and feeding of conducting insert blanks.
Figure 4A:
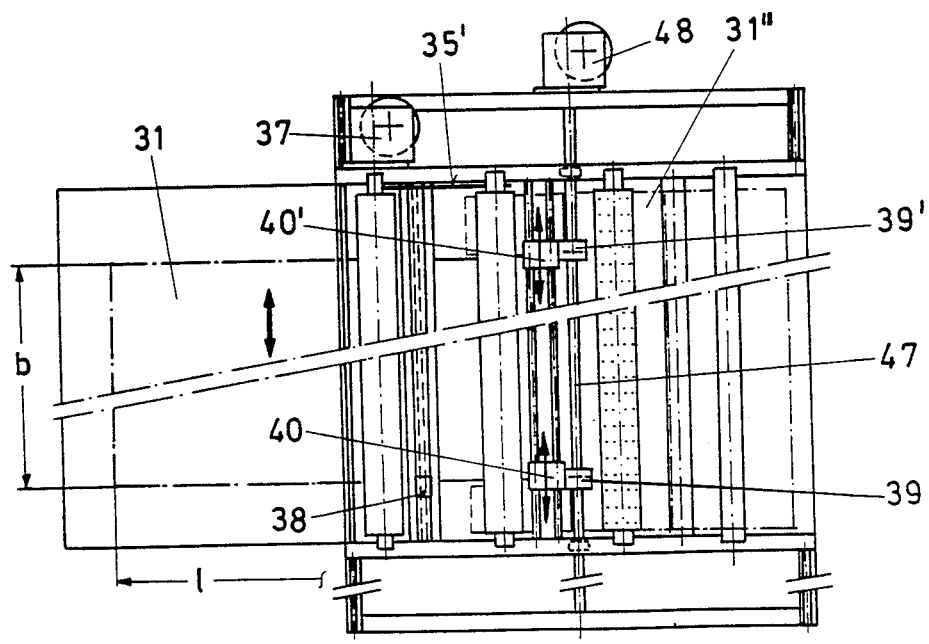
FIG. 4a is a plan view of the device of FIG. 4.

A more detailed description of the apparatus 30 for the preparation and introduction of insert blanks is presented in connection with FIGS. 4 and 4a, together with a description relative to FIGS. 7 and 7a, of a combination with the apparatus 50 for the formation of a stack of sheets.

The winding apparatus 10 itself, according to FIG. 1 and in particular FIGS. 2, 2a and 2b, comprises a drive roll 4 displaceable in the longitudinal direction, with a drive motor 17, preferably a worm drive motor, a lower rigidly supported retaining roll 1, a mobile retaining roll 2 located above said roll 1 moving in a vertical guide 14, and a reversing roll 3 preceding the winding apparatus 10. The retaining rolls 1, 2 support the winding process of the freely supported winding mandrel 5. The drive roll 4 is located on a carrier slide 16, which is mounted on the frame of the winding apparatus 10. The carrier slide 16 is displaceable in the longitudinal direction by means of a threaded rod 15 equipped with end bearings 6, 6'. The rolls 1 to 4 are connected with each other by means of a conveyor belt 9 revolving in the running direction over the rolls 4,1,3,1,5 and 8,2,4).

To form the wound body 8 of the insulating material, prior to the onset of the winding process a rigid conductor or a rigid inner tube or a winding mandrel 5 is freely and rollingly supported between the rolls 1, 2, and looped around by the conveyor belt 9 in a manner such that during the growth of the wound body 8 of the insulating material the upper roll 2 is displaceable upwards and the drive roll 4 is displaceable in the direction of the two rolls 1, 2. At the onset of the winding process onto the conductor or the inner tube 5, the upper roll 2, the drive roll 4, the conductor or inner tube 5, the wound body 8 and the conveyor belt 9 are in the initial positions indicated by solid lines. Upon the growth of the wound body 8, the roll 2 moves upward in the guide 14, and the drive roll 4 moves in the direction of the rolls 1, 2. The conductor or the inner tube 5, the body 8, and the conveyor belt 9 also change their positions correspondingly, until the winding body 8 is fully wound and the terminal positions indicated by dash-and-dot lines are attained. In order to be able to remove the finished wound body 8 from the winding apparatus 10, the upper roll 2 must be moved further upward in the vertical guide 14 into its position indicated by broken lines, preferably by manual means.

In the area of the conveyor belt 9, between the fixedly mounted reversing roll 3 and the fixedly mounted lower roll 1, under the conveyor belt 9, a vacuum chamber 11 with an indicated vacuum connection line 12 is provided, so that a vacuum may be applied in a manner such that said area of the conveyor belt acts as a suction table 9' and may be used to take over, position and further transport the winding material, i.e., the sheets 21 and/or the precut sheet blanks 21' and the insert blanks 31.

Figure 8:
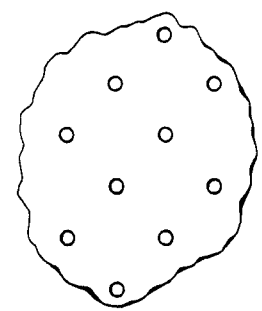
FIG. 8 is a view of a portion of a conveyor belt used in one embodiment of the present invention.
Figure 9:
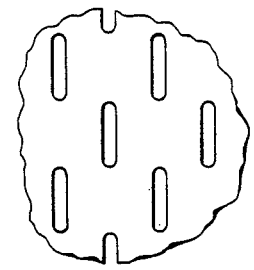
FIG. 9 is a view of a portion of a conveyor belt used in another embodiment of the present invention.
Figure 10:
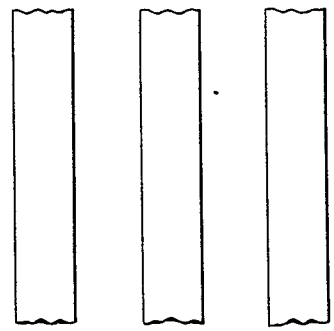
FIG. 10 is a view of a portion of a belt arrangement using a plurality of belts.

The conveyor belt 9 may have a full width and be designed so as to enable the suction effect by means of rows of punched-out openings. The openings may be in the form of round holes (FIG. 8), slots, (FIG. 9), or the like. The conveyor belt 9 may alternatively consist of a plurality of narrow belts (FIG. 10), located spaced apart and parallel to each other. Conveyor belts of this type, known in themselves, contain several layers with corrugated inner layers and are preferably comprised of polyamide with an antistatic elastomer coating.

To signal the end of the winding material 21, 21', 31, being placed on the conveyor belt 9 a contactless switch 19, preferably a photocell, is provided in front of the reversing roll 3. When such a signal is received, a new piece of winding material is placed on the conveyor belt.

In front of the lower roll 1, a plurality of application devices, for example, devices for the application of an adhesive to the sheet of insulating material 21 and/or the precut sheet blanks 21', is provided, thereby assuring the bonding of the sheets to the wound body 8. A cutting device 13, 13' is provided for the cutting of the insulating material sheets or precut blanks with a blade guide, in order to be able, as illustrated in detail in FIGS. 4 and 4a, to apply the leading insert blanks 31 to the wound body 8 at predetermined diameters in a coaxially closed manner.

Figure 3:
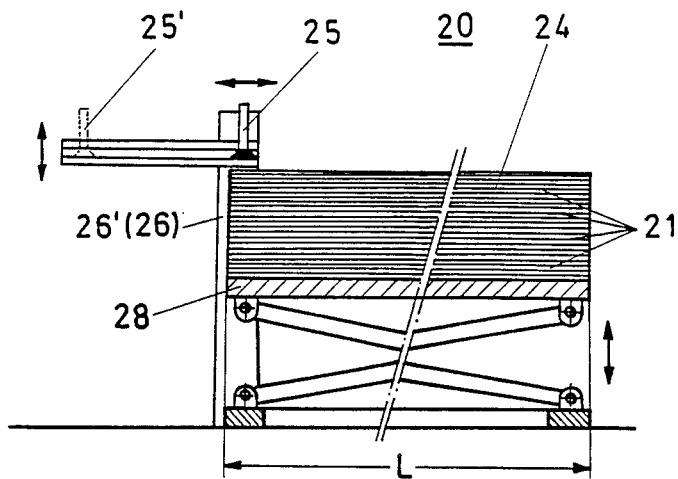
FIG. 3 is a lateral elevation of a device for taking sheets from a stack and transporting them to the winding apparatus.
Figure 3A:
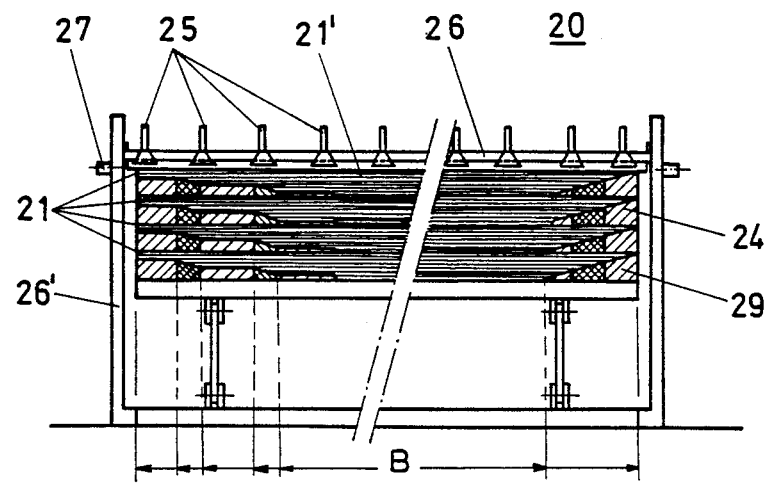
FIG. 3a is a cross section of the device of FIG. 3.

The apparatus 20 for the lifting and transportation of insulating material sheets and/or bland from the stack 24 to the winding apparatus 10, according to FIGS. 3 and 3a, comprises a plurality of suction means 25 displaceable over the entire winding width (B) horizontally and over the height of the stack vertically, on guide rails 26 and 26', which seize by suction the insulating sheets 21 and/or blanks 21' at their edge facing the winding apparatus 10 and transfer them to the section 9' of the conveyor belt of the winding apparatus 10 which serves as a suction table. The suction means 25 may be actuated or deactuated individually. In FIG. 3, the horizontal displacement of the suction devices 25 from the initial position indicated by solid lines into the transfer position 25' shown by dash-and-dot lines above the suction table 9' (according to FIG. 1) of the winding apparatus 10. Any type of indicated 27 known in the art, such as an interruptable light beam, may be used to automatically maintain a table 28 at a preferred level.

The apparatus 30 for the preparation and introduction of the leading insert blanks according to FIGS. 4 and 4a, may be a component of the winding apparatus according to FIG. 1 (solid lines), or combined with a known device 50 for the formation of a stack of sheets (broken lines), according to FIGS. 7 and 7a. The apparatus 30, which is displaceable in a frame 45 vertically (not shown) and horizontally, consists of an unrolling device 49 for a web 31" being drawn from a roll 31' of an insert sheet material, a turn roll 46, a lifting perforating roll 32 with a counter roll 33, and a cutting installation formed by two blades 39, 39' located in the longitudinal direction of the insert sheet web 31" to cut the insert blanks 31. The apparatus 30 also includes conventional edge folding installations 40, 40' also located in the longitudinal directions on either side of the already cut inserts, and a drive roll 34 equipped with a motor 37, wherein the drive roll is connected by means of a chain connection 35' with a tension roller 35. Corresponding pairs of rolls 36, 36' is provided with a cutting installation 38 located between them transversely to the insert sheet web 31". A deflecting device 41 is shown schematically for deflecting edging waste into a waste container 43. The apparatus 30 further includes two applicator devices 44, 44' for the, preferably drop-wise, application of an adhesive to the upper and/or edge surface of the insert blanks 31. The apparatus 30 may be displaced horizontally by means of a horizontal shaft 47 and motor drive 48 and by vertical guides (not shown) adjustable in height. A downward curving guide surface in the form of a chute 42 is provided for the transport of the insert blanks 31 to the corresponding sheets 21 and/or blanks 21' of the insulating material.

Figure 5:
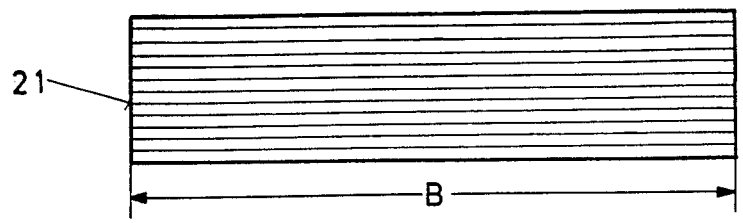
FIG. 5 is a cross section of a stack of insulating material sheets without conducting insert blanks.
Figure 6:
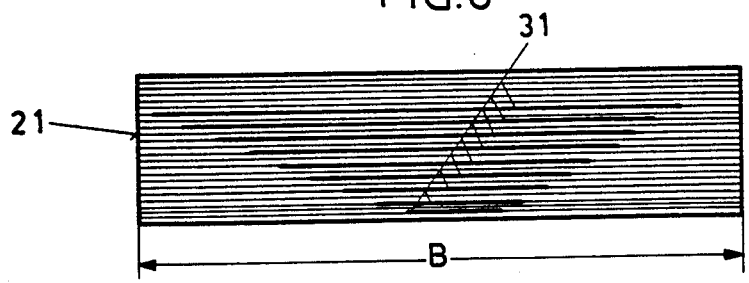
FIG. 6 is a cross section of a stack of insulating material precut sheets without conducting insert blanks.

The stack 24 may be built up, according to FIG. 5 and FIG. 6, of insulating sheets 21 with or without the corresponding conducting inserts 31. A wound body 8 of an insulating material of this type must be adapted, for example for bushings, on both ends by cutting the wound body 8 mechanically, following a vacuum treatment and plastic impregnation, as usual, into a conical shape.

Figure 5A:
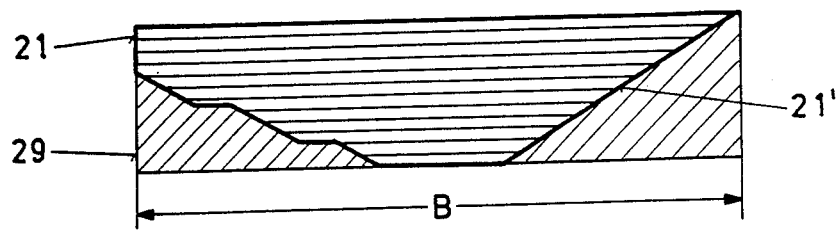
FIG. 5a is a cross section of a stack of insulating material sheets with conducting insert blanks.
Figure 6A:
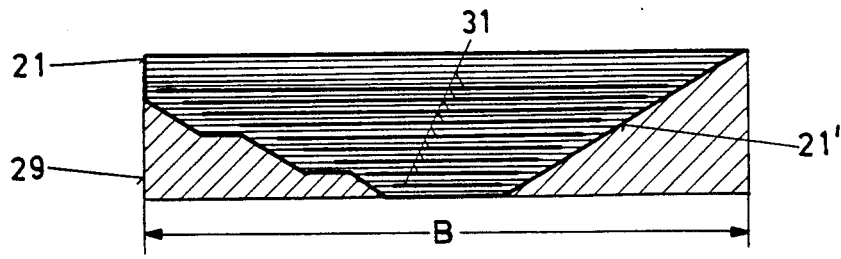
FIG. 6a is a cross section of a stack of insulating material precut sheets with conducting insert blanks.

According to FIG. 5a and FIG. 6a, the winding material, i.e., the sheets 21 or the cut blanks 21' and optionally the conducting insert blanks 31, may be prepared already during the formation of the stack 24 in a preceding work stage discontinuous relative to the winding apparatus 10, in a manner such that the winding material 21, 21', 31 is stacked in keeping with the final shape of the wound body 8 of the insulating material. As the cut sheet blanks 21' may be cut to different lengths (1') (FIGS. 7 and 7a) without waste, significant material savings are obtained. In the formation of a sheet stack of this type according to FIGS. 7 and 7a, supports 29 (according to FIGS. 5a and 6a) may be inserted manually to fill out the cavities formed by the insulating sheet blanks 21' in the stack, which is important particularly in the case of complex wound body configurations.

The apparatus 50 for the formation of a sheet stack consists of an unrolling device 51 with an endless web of the insulating material wound onto a roll 52, a reversing roll 53 with a pair of measuring rolls 54, 54' to measure the width (B) of the insulating sheets, a conveyor roll 55 driven by a motor 57 and cooperating with a, preferably pneumatically pivoting, counter roll 56. Upon the introduction of the web 52' of the insulating material, the counter roll 56 is raised by a manually actuated pneumatic cylinder 56' from the conveyor roll 55. By means of a cutting installation 58 located transverse to the web 52 of the insulating material, the length (1') corresponding to the width (B) of the insulating sheet is cut, with a clamping device 59 being provided to hold the end of the insulating sheet. An apparatus 20, such as that illustrated in FIGS. 3 and 3a, to take up the insulating sheet, at this time to form a sheet stack 24, follows in line. If conducting insert blanks 31 are to be introduced and bonded to the corresponding insulating sheets 21 and/or insulating blanks 21' during the formation of the stack 24, the apparatus 50 for the formation of the sheet stack and the apparatus 20 for the takeoff of the insulating sheets, is additionally combined with the apparatus 30 for the preparation and introduction of conducting blanks 31 according to FIGS. 4 and 4a. The apparatus 30 may also be combined in a manner such that, in keeping with FIG. 1, it may be displaced from the winding apparatus 10 to the apparatus 50 for the formation of a stack and vice versa. Any type of indicator 27 known in the art, such as an interruptable light beam, may be used to automatically maintain the height of a table 28 upon which the stack is formed.

The mode of operation of the apparatus whereby the winding material consisting of the insulating sheets 21 and/or the precut sheet blanks 21' and optionally the conducting insert blanks 31 are processed into wound insulating bodies 8, is as follows:

In the installation 50 for the formation of a sheet stack, which operates discontinuously relative to the winding apparatus 10, the insulating material is precut and stacked into a stack 24. The stack 24 precedes the winding apparatus 10 in a manner such that the winding material may be taken sheet by sheet or layer by layer from the stack 24 and transported to the winding apparatus 10, with the width (B) of the insulating sheet, which coincides with the necessary winding width and the height of the winding of the insulating material, corresponding to the length of the insulating material sheet section (1'), and the length (L) of the insulating sheet corresponding to the width (b') of the insulating web. The insulating sheet 21 and/or the precut sheet blank 21' oriented in this manner are entrained by the conveyor belt 9 between the lower roll 1 and the reversing roll 3 of the winding apparatus 10 and the belt segment 9 acting as a suction table, and wound successively, edge on edge without gaps, onto the freely supported conductor or the inner tube 5 and the wound body 8, respectively. By means of the applicator devices 7 an adhesive is applied in dots over the entire width (B) to the edge surface of the insulating sheet 21 or the blank 21', whereby the winding material 21, 21' is bonded to the wound body 8. If it is desired to control the potential of the apparatus, for example in a capacitor bushing, conducting insert blanks 31 are applied to the wound body 8. The apparatus 30, shown in detail in FIGS. 4 and 4a for the preparation and introduction of insert blanks according to FIG. 1, indicated by solid lines, is combined with the winding apparatus 10, so that the insert blanks 31 are placed on the insulating sheets 21 located on the suction table 9' shown in FIGS. 2 and 2a, bonded and wound together with the insulating sheet 21 onto the wound body 8.

If the insert blanks 31 are to be applied over the appropriate circumference of the wound body 8 in a coaxially closed manner, the feeding of the insulating sheets 21 is interrupted in phases and optionally cut by the cutting installation 13, 13' transversely to the conveyor belt 9, so that the insert blank 31 is moved directly to the conveyor belt segment 9' acting as a suction table, positioned and transported to the wound body 8 and wound. The insert blanks 31 may also be stacked according to FIG. 1 and FIG. 7 by the installation 50 indicated by shading for the formation of a sheet stack 24, together with the insulating sheet 21 and/or the cut sheet blanks 21', together with the insulating sheet 21 and/or the cut sheet blanks 21', by placing the insert blanks 31, optionally under the control of a computer, onto the sheets 21 and/or blanks 21', bonding them to said sheets, which correspond to a predetermined diameter of the wound body 8 after winding.

The insert blanks 31 may previously be perforated and/or folded on one or both sides, as illustrated in FIGS. 4 and 4a.

By the longitudinal displacement relative to the winding direction of the apparatus 30 for the preparation and introduction of insert blanks according to FIG. 1, the winding apparatus 10, the apparatus 50 for the formation of sheet stack and the apparatus 30, may be combined with each other.

The insulating sheets 21 and/or the sheet blanks 21' may consist of smooth paper, crepe paper or another material. Winding in the manner described above the sheets 21 and/or sheet blanks 21' oriented relative to the sheet width (B) to the sheet length (L), is particularly advantageous if crepe paper is used, as the crepe pattern extends in the direction of the winding width (B) and is fully preserved during winding, as the crepe pattern cannot be stretched by the tensionless guidance of the winding material 21, 21', so that a homogeneous wound body 8 is assured.

Having shown and described preferred embodiments of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. An apparatus for winding a coaxial insulation material in layers onto freely supported winding core for electrical insulation purposed to create a wound body, comprising:
   a winding installation including a revolving conveyor belt on the winding installation for winding the sheets on the winding core;
   a stacking rack adjacent the winding installation for supporting a stack of rectangular sheets cut from a web of the insulating material such that a side of the cut sheets that formed the side edge of the web is facing the winding installation;
   means for individually taking the sheets from the rack and moving them with said side to the winding installation so that the front edge of the subsequent sheet of the insulating material abuts against the rear edge of the preceding sheet of the insulating material;
   means for the discontinuous cutting of leading insert blanks, for feeding the cut insert blanks onto predetermined sheets of the insulating material, and for attaching the cut insert blanks to the predetermined sheets.

2. The apparatus according to claim 1, further comprising means for preparing and cutting conducting insert blanks to be applied to the winding core, said preparing and cutting means being placed in line with the winding apparatus and the taking means.

3. The apparatus according to claim 1, wherein the winding apparatus comprises:
   a drive roll displaceable horizontally in the longitudinal direction of the winding apparatus;
   a lower retaining roll and an upper retaining roll;
   a reversing roll; and
   wherein said conveyor belt connects all of said rolls with each other, said conveyor belt revolving in a running direction over said rolls in such a manner so as to freely support the winding core between the lower and upper retaining rolls;
   said upper roller being vertically displaceable and said lower roll being rigidly supported.

4. The apparatus of claim 3, further comprising a vertical guide for the upper roll;
   wherein said conveyor belt is looped around the winding core so that during the growth of the wound body, the upper roll is displaced upwards in the vertical guide, and the drive roll is displaced horizontally toward the upper and lower rolls.

5. The apparatus of claim 3, further comprising suction means between the lower roll and the reversing roll so that the conveyor belt functions as a suction table as the conveyor belt passes from the reversing roll to the lower roll.

6. The apparatus according to claim 1, wherein the winding core is a rigid conductor.

7. The apparatus according to claim 1, wherein the winding core is a rigid insulating tube.

8. The apparatus according to claim 3, wherein the cutting, feeding, and attaching means includes:
   an unwinding installation for a web of conducting material; a pair of rolls for receiving the web of conducting material, one of which is a perforating roll capable of being raised; a first cutting installation for the formation of insert blanks from the web of conducting material with two blades located in the longitudinal direction on either side of the web of conducting material; edge folding installations located in the longitudinal direction on either side of the insert blanks; a drive roll for driving the material, said drive roll connected by means of a chain to a tension roll with guide rolls; and a second cutting installation located between the pair of rolls with a blade mounted transversely to the insert blanks, and two applicator devices to bond the insert blanks to the insulation material and/or the wound body; and a downwardly curving surface in the form of a chute is provided for the transport of the conducting material.

9. The apparatus according to claim 3, further comprising:
   for the transport and positioning of the insulation material in the area of the conveyor belt, a vacuum chamber located under said conveyor belt, said conveyor belt being provided with a plurality of orifices for the application of a vacuum,
   upstream of the reversing roll in the running direction a contactless switch is provided,
   upstream of the lower roll an applicator device is provided, and
   transversely over the conveyor belt a cutting installation is located.

10. The apparatus according to claim 9, wherein the orifices of the conveyor belt are round holds and form rows of openings.

11. The apparatus according to claim 9, wherein the orifices are in the form of slots.

12. The apparatus according to claim 3, wherein the conveyor belt consists of a plurality of belts, spaced apart and parallel to each other.

13. The apparatus according to claim 8, wherein the cutting, feeding, and attaching means is adapted so that it can be displaced parallel and transversely to the direction of motion of the conveyor belt of the winding apparatus and may also be moved vertically.

14. The apparatus according to claim 8, wherein the cutting, feeding, and attaching means is integrated with the winding apparatus.

15. The apparatus according to claim 8, wherein the conducting insert blanks may be placed onto corresponding insulating sheets by the installation for the preparation and introduction of conducting insert blanks, bonded thereto and stacked together with the insulating sheets.

16. The apparatus according to claim 13, wherein for the removal of the edging waste of the conducting insert blanks, on either side of the conducting insert blanks, a deflecting device to a waste container is provided.

17. The apparatus according to claim 1, wherein the stacking rack of sheets is automatically adjustable in height and that for the insulating sheet blanks on either side of the stack manually inserted supports are provided.

18. The apparatus according to claim 14, wherein for the removal of the edging waste of the conducting insert blanks, on either side of the conducting insert blanks, a deflecting device to a waste container is provided.

19. A process for the preparation of bodies wound with an insulating material and free of gaps and cracks, for purposes of electrical insulation, comprising the steps of:

drawing a web of an insulating material from a roll;

cutting the insulating material into sheets of a desired length;

stacking the cut sheets into a stack;

transporting the cut sheets to a winding installation;

introducing the cut sheets from the stack to a winding core such that the leading edge of the sheet is transverse to the cut length;

winding the cut sheets onto a winding core by means of a revolving conveyor belt without tensile stressing;

bringing the beginning of the next sheet of the insulating material edge to edge against the end of the preceding sheet; and continuing the winding until the wound body of insulating material is completed.

20. The process according to claim 19, further comprising the steps of:

unwinding leading insertion blanks from a foil winding web and cutting them to the planar size desired;

transporting the cut insertion blanks onto predetermined sheets of the insulating material and attaching the cut insertion blanks to the predetermined sheets.

* * * * *